United States Patent
Kwon et al.

(10) Patent No.: US 10,813,145 B2
(45) Date of Patent: Oct. 20, 2020

(54) METHOD AND APPARATUS FOR CONTROLLING APPARATUS BY USING BLUETOOTH TECHNOLOGY

(71) Applicant: LG ELECTRONICS INC., Seoul (KR)

(72) Inventors: Younghwan Kwon, Seoul (KR); Jonghun Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/477,743

(22) PCT Filed: Jan. 12, 2018

(86) PCT No.: PCT/KR2018/000612
§ 371 (c)(1),
(2) Date: Jul. 12, 2019

(87) PCT Pub. No.: WO2018/131929
PCT Pub. Date: Jul. 19, 2018

(65) Prior Publication Data
US 2019/0364608 A1    Nov. 28, 2019

Related U.S. Application Data

(60) Provisional application No. 62/445,747, filed on Jan. 13, 2017, provisional application No. 62/467,241, (Continued)

(51) Int. Cl.
*H04W 76/10* (2018.01)
*H04W 4/80* (2018.01)
*H04L 12/24* (2006.01)

(52) U.S. Cl.
CPC ............. *H04W 76/10* (2018.02); *H04L 41/06* (2013.01); *H04W 4/80* (2018.02)

(58) Field of Classification Search
CPC .......... H04W 76/10; H04W 4/80; H04L 41/06
See application file for complete search history.

(56) References Cited

U.S. PATENT DOCUMENTS 7,058,773 B1 *   6/2006   Frye, Jr. .............. G06F 11/1666
                                                            711/162
2012/0011301 A1 *  1/2012   Goss .................. G06F 12/0246
                                                            711/103
(Continued)

FOREIGN PATENT DOCUMENTS

WO    WO 2016/108646 A1    7/2016
WO    WO 2016/122186 A1    8/2016
WO    WO 2016/182404 A1    11/2016

*Primary Examiner* — Nguyen T Vo
(74) *Attorney, Agent, or Firm* — Birch, Stewart, Kolasch & Birch, LLP

(57) ABSTRACT

The present invention relates to a method and an apparatus for controlling, by a client, a server via Bluetooth. The present invention provides a method and an apparatus that form a Bluetooth low energy (LE) connection with a server: transmit, to the server, a first write request message requesting writing of a control point characteristic for an instruction of a specific operation; receive a first write response message in response to the write request message; and receive, from the server, a first instruction message for instructing whether to perform the specific operation, wherein the first write request message includes a first operation code indicating the specific operation and a first effective time indicating a time of performing the specific operation.

10 Claims, 12 Drawing Sheets

Related U.S. Application Data filed on Mar. 5, 2017, provisional application No. 62/525,196, filed on Jun. 27, 2017, provisional application No. 62/529,405, filed on Jul. 6, 2017.

(56) References Cited

U.S. PATENT DOCUMENTS

| | | | |
|---|---|---|---|
| 2016/0184635 A1* | 6/2016 | Kwon | H04W 76/10 |
| | | | 455/41.2 |
| 2016/0323012 A1 | 11/2016 | Kwon et al. | |
| 2016/0359629 A1* | 12/2016 | Nadathur | H04L 12/2818 |
| 2016/0360345 A1 | 12/2016 | Kim et al. | |

\* cited by examiner

Fig. 9

| Opcode Value | Procedure or Opcode | Requirement |
|---|---|---|
| 0x00 | Reserved for Future Use | |
| 0x01 | BR/EDR Acceptor Control Procedure | M |
| 0x02 | BR/EDR Initiator Control Procedure | M |
| 0x03 | LE Peripheral Control Procedure | M |
| 0x04 | LE Central Control Procedure | M |
| 0x05 | Association Termination Procedure | M |
| 0x06 | Select Client List Bank Procedure | C.1 |
| 0x07 | Reset Client UUID Selection Policy Info Procedure | C.1 |
| 0x08 – 0x30 | Reserved for Future Use | |
| 0x31 | Confirm Value Indication Opcode | M |
| 0x32 | Confirm Value Relay Opcode | M |
| 0x33 | Control Point Response Indication Opcode | M |
| 0x34 | Abort Opcode | M |

Fig. 10

| Response Code | Definition | Description |
|---|---|---|
| 0x00 | Success | Server is successfully performed with its peer device. |
| 0x01 | Not Discovered | Server does not discover its peer device. |
| 0x02 | Not Authenticated | Server is not connected with its peer device. |
| 0x03 | Failed | Server is failed to operate the requested procedure. |
| 0x04 | Insufficient Resources | Server does not have enough resources to operate the requested procedure |
| 0x05 | Timeout | Server does not complete its operation during the timeout. |
| 0x06 | Unavailable Bank | Server does not change the current bank with the requested bank counter. |
| 0x07 | Address Not Resolved | Server does not resolve the Resolvable Private Address. |
| 0x08 | Undefined Bearer | Server does not support the undefined bearers. |
| 0x0A | Secure Connections Required | Server does not authenticate with Secure Connections Pairing. |
| 0x0B | Unavailable Address Type | Server does not support the requested Address type. |
| 0x0C | Unavailable Control Point Opcode | Server does not support the requested Control Point Opcode. |
| 0x0D | Unavailable Operations | Server does not support the requested Operation. |
| 0x0E | Unavailable Effective Time | Server does not support the value of the Effective Time field. |
| 0x0F | Not Finished | Server does not finish the previous procedure. |
| 0x10 | No Confirm Value | Server cannot generate its Confirm Value. |
| 0x11 | Aborted | Server aborts the requested procedure |
| 0x12-0xFF | | Reserved for Future Use |

Fig. 11

| Definition | Description |
|---|---|
| Wrong IRK | Server can not perform the ordered behavior due to wrong IRK |
| Not in Whitelist | The Peer device is not in the whitelist of the Server. |
| No Association | There is no association to control the association. |
| Long Operation Duration | The operation duration is too long to be operated |
| Short Operation Duration | The operation duration is too short to be operated |

METHOD AND APPARATUS FOR CONTROLLING APPARATUS BY USING BLUETOOTH TECHNOLOGY

CROSS REFERENCE TO RELATED APPLICATIONS

This application is the National Phase of PCT International Application No. PCT/KR2018/000612, filed on Jan. 12, 2018, which claims priority under 35 U.S.C. 119(e) to U.S. Provisional Application No. 62/445,747, filed on Jan. 13, 2017, U.S. Provisional Application No. 62/467,241, filed on Mar. 5, 2017, U.S. Provisional Application No. 62/525,196, filed on Jun. 27, 2017, and U.S. Provisional Application No. 62/529,405, filed on Jul. 6, 2017, all of which are hereby expressly incorporated by reference into the present application.

TECHNICAL FIELD

The present invention relates to a method and apparatus for controlling a device using Bluetooth, that is, a short-distance technology, in a wireless communication system and, more particularly, to a method and apparatus for controlling, by a client, a server using a Bluetooth technology.

BACKGROUND ART

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

Bluetooth low energy (hereafter referred to as Bluetooth LE) is applied from Bluetooth 4.0, and consumes low power and can stably provide information of hundreds of kilobytes (KB). Such a BLE technology allows devices to exchange information with each other using an attribute protocol. The BLE method can reduce energy consumption by reducing the overhead of a header and simplifying the operation.

Some of Bluetooth devices do not have a display or a user interface. The complexity of a connection, management, control, and a disconnection increases between various types of Bluetooth devices and Bluetooth devices to similar technologies have been applied among the Bluetooth devices.

Furthermore, Bluetooth may have a high speed with relatively low power and at a relatively low cost, but is suitable for being used in a limited space because it has a limited maximum transmission distance of 100 m.

DISCLOSURE

Technical Problem

The present invention provides a method and apparatus for controlling a device using a Bluetooth technology.

Furthermore, the present invention provides a method and apparatus for controlling, by a client, a server so that the server performs a specific operation.

Furthermore, the present invention provides a method and apparatus for performing, by a server, an indicated specific operation during or within a set operation time when an operation time for performing the specific operation is set by a client.

Furthermore, the present invention provides a method and apparatus for defining an error message according to each service if a server cannot perform a specific operation indicated by a client.

Technical objects to be achieved in this specification are not limited to the above-described technical objects, and other technical objects not described above may be evidently understood by a person having ordinary skill in the art to which the present invention pertains from the following description.

Technical Solution

The present invention provides a method and apparatus for controlling, by a client, a server in Bluetooth for solving the above-described problems.

Specifically, a method for controlling, by a client, a server according to an embodiment of the present invention includes forming a Bluetooth low energy (LE) connection with a server, transmitting, to the server, a first write request message to request the writing of a control point characteristic for an indication of a specific operation, receiving a first write response message as a response to the write request message, and receiving, from the server, a first indication message for indicating whether the specific operation has been executed, wherein the first write request message includes a first operation code indicating the specific operation and a first effective time indicating the execution time of the specific operation.

Furthermore, in the present invention, if the specific operation has been successfully executed, the first indication message includes a response code indicating the success of the specific operation.

Furthermore, in the present invention, if the execution of the specific operation has failed, the indication message includes an error code indicating a failure cause.

Furthermore, in the present invention, if the error code indicates non-support for the first effective time, the indication message further includes a second effective time supported by the server.

Furthermore, in the present invention, if the first effective time is greater than a maximum execution time of the specific operation, the second effective time indicates the maximum execution time. If the first effective time is smaller than a minimum execution time of the specific operation, the second effective time indicates the minimum execution time.

Furthermore, the present invention further includes transmitting, to the server, a second write request message to request the writing of the control point characteristic in order to indicate the cancellation of the specific operation, receiving a second write response message as a response to the second write request message, and receiving, from the server, a second indication message indicating whether the specific operation has been aborted. The second write request message includes a second operation code indicating the cancellation of the specific operation.

Furthermore, in the present invention, if the specific operation is an operation performed along with another device, the first write request message further includes a device ID for identifying a peer device.

Furthermore, the present invention provides a terminal, including a communication unit communicating with an outside in a wired or wireless manner, a memory storing data, and a processor functionally connected to the communication unit. The processor is configured to form a Bluetooth low energy (LE) connection with a server, transmit, to the server, a first write request message to request the writing of a control point characteristic for an indication of a specific operation, receive a first write response message as a response to the write request message, and receive, from the server, a first indication message for indicating whether the specific operation has been executed. The first write request message includes a first operation code indicating the specific operation and a first effective time indicating the execution time of the specific operation.

Advantageous Effects

There is an effect in that a client can control an operation of a server device using a Bluetooth technology according to an embodiment of the present invention.

Furthermore, according to the method for controlling, by a client, a server according to an embodiment of the present invention, there is an effect in that a waiting time taken for a client to determine whether a specific operation has been performed can be reduced because the client configures the specific operation and an operation time taken to perform the specific operation with respect to a server.

Furthermore, there is an effect in that a client can rapidly recognize whether an operation has failed when a server fails in the operation indicated by the client.

Furthermore, there is an effect in that a client can clearly recognize a failure cause an error code indicating a failure cause of an operation is classified and defined for each service and cause.

Effects which may be obtained in this specification are not limited to the above-described effects, and other technical effects not described above may be evidently understood by a person having ordinary skill in the art to which the present invention pertains from the following description.

DESCRIPTION OF DRAWINGS

The accompanying drawings, which are included herein as a part of detailed descriptions to help understanding the present invention, provide embodiments of the present invention and describe technical features of the present invention with detailed descriptions below.

FIGS. 8 to 11 are diagrams showing a method for controlling, by a client, a server and an example of a data format, which are proposed in this specification.

MODE FOR INVENTION

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

Figure 1:
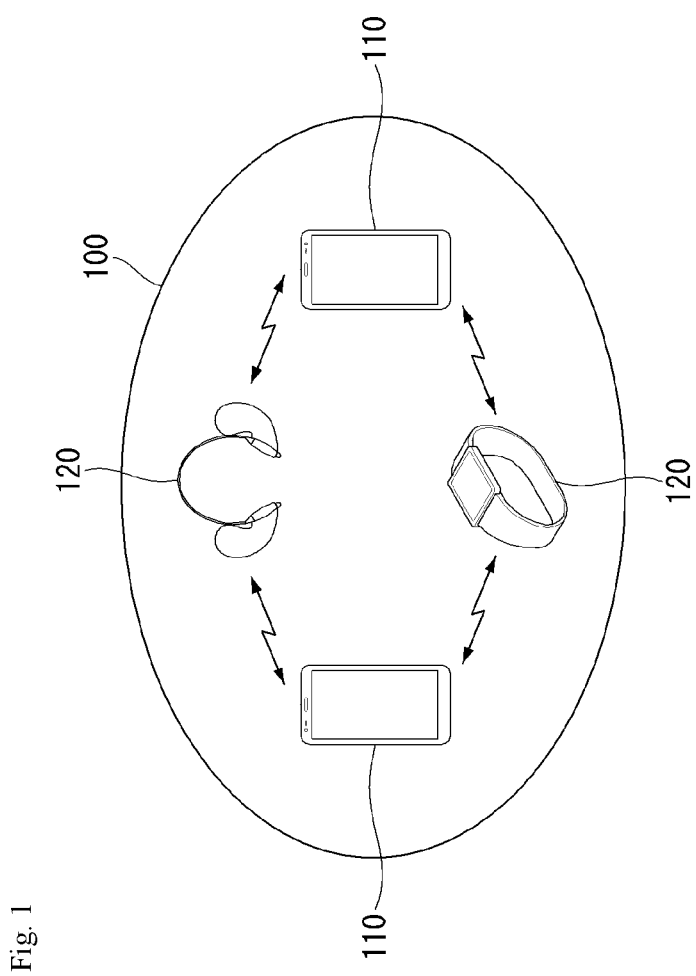
FIG. 1 is a schematic view illustrating an example of a wireless communication system using a Bluetooth low energy technology which is proposed in this specification.

FIG. 1 is a schematic view illustrating an example of a wireless communication system using a Bluetooth low energy technology to which the present invention is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Furthermore, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may also be called as data service device, slave device, slave, server, conductor, host device, gateway, sensing device, monitoring device, or the like.

The client device 110 may also be called as master device, master, client, member, sensor device, sink device, collector, third device, fourth device and the like.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Furthermore, in order to provide data information to the client device, the server device sends a notification message or an indication message to the client device in order to provide data information to the client device. Furthermore, the server device receives a confirmation message corresponding to the indication message from the client device.

Furthermore, in the process of transmitting and receiving notification, indication, and confirmation messages to and from the client device, the server device may provide data information to a user through a display unit or may receive a request input from the user through a user input interface.

Furthermore, in the process of transmitting and receiving message to and from the client device, the server device may read data from a memory unit or may write new data to the corresponding memory unit.

Furthermore, the single server device may be connected with a plurality of client devices, and may be easily reconnected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Furthermore, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 2.

Furthermore, the wireless communication system may configure personal area networking (PAN) through the Bluetooth technology. For example, in the wireless communication system, a private piconet may be established between devices to quickly and safely exchange files, documents.

Figure 2:
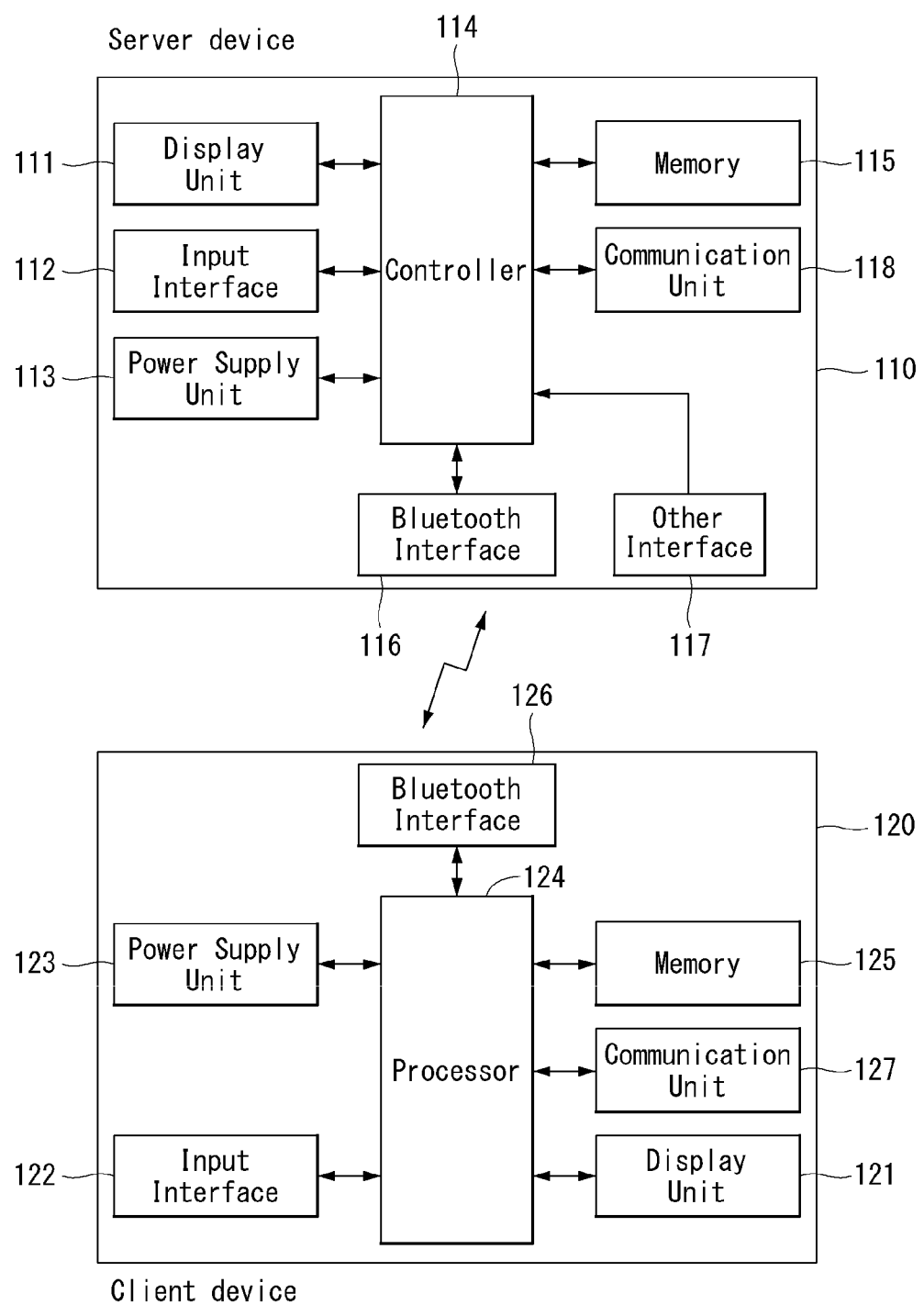
FIG. 2 illustrates one example of an internal block diagram of a device in which methods proposed in this specification may be implemented.

FIG. 2 illustrates one example of an internal block diagram of a device in which the methods proposed by the present specification may be implemented.

As illustrated in FIG. 2, a server device includes a display unit 111, a user input interface 112, a power supply unit 113, a processor 114, a memory unit 115, a Bluetooth interface 116, other interface 117, and a communication unit (or transceiver unit) 118.

The display unit 111, the user input interface 112, the power supply unit 113, the processor 114, the memory unit 115, the Bluetooth interface 116, other interface 117, and the communication unit 118 are functionally connected to each other to perform a method proposed in this disclosure.

Furthermore, the client device includes a display unit 121, a user input interface 122, a power supply unit 123, a processor 124, a memory unit 125, a Bluetooth interface 126, and a communication unit (or transceiver unit) 128.

The display unit 121, the user input interface 122, the power supply unit 123, the processor 124, the memory unit 125, the Bluetooth interface 126, other interface 127, and the communication unit 128 are functionally connected to each other to perform a method proposed in this disclosure.

The Bluetooth interface 116, 126 refer to a unit (or module) capable of transmitting data, such as a request/response, a command, a notification, an indication/confirmation message between devices.

The memory unit 115, 126 is a unit implemented in various types of devices, in which various types of data are stored.

The processor 114, 124 refers to a module controlling a general operation of a server device or a client device, which controls requesting transmission of a message through the Bluetooth interface and other interface and processing a received message therethrough.

The processor 114, 124 may also be called a controller, a control unit.

The processor 114, 124 may include an application-specific integrated circuit (ASIC), other chip set, a logic circuit and/or data processing unit.

The processor 114, 124 controls a communication unit to receive an advertising message from the server device, control the communication unit to transmit a scan request message to the server device and receive a scan response message as a response to the scan request from the server device, and control the communication unit to transmit a connection request message to the server device in order to establish a Bluetooth connection with the server device.

Furthermore, after the Bluetooth LE connection is established through the connection procedure, the processor 114, 124 controls the communication unit to read or write data by using an attribute protocol from the server device The memory unit 115, 125 may include a read-only memory (ROM), a random access memory (RAM), a flash memory, a memory card, a storage medium and/or other storage devices.

The communication unit 118, 127 may include a baseband circuit for processing a wireless signal. When an embodiment is implemented by software, the aforementioned technique may be implemented as a module (process, function, etc.) performing the aforementioned function. The module may be stored in a memory unit and may be executed by a processor.

The memory unit 115 may be present inside or outside the processor 114, 124, and may be connected to the processor 114, 124 through various well-known means.

The display unit 111, 121 refers to a module providing status information of a device, message exchange information, to a user through a screen.

The power supply unit 113, 123 refers to a module receiving external power or internal power and supplying power required for operations of the elements under the control of the controller.

As described above, BLE technology uses a small duty cycle and able to reduce power consumption considerably through a low speed data transmission rate.

The user input interface 112, 122 refers to a module providing a user input, such as a screen button to the controller to enable a user to control an operation of a device.

Figure 3:
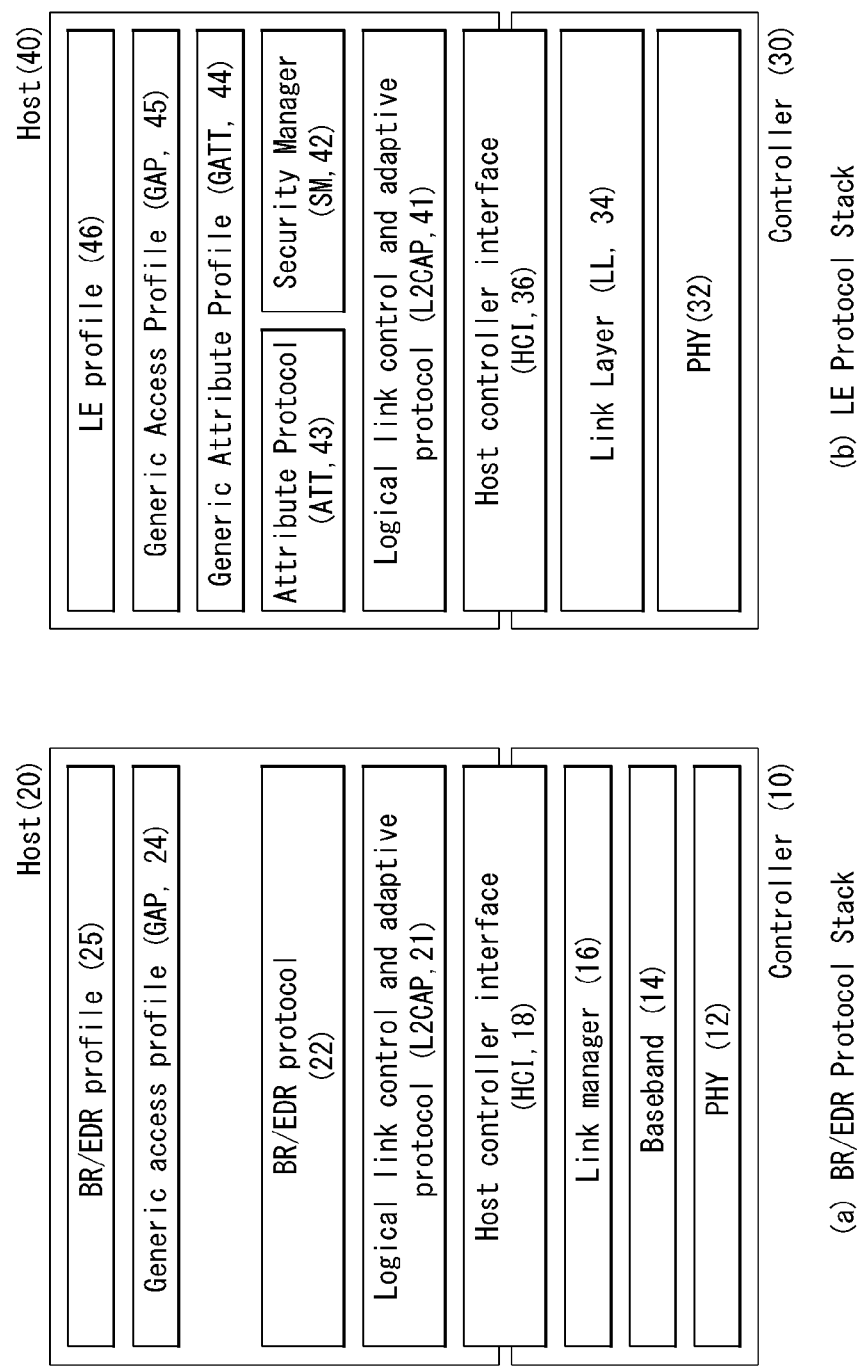
FIG. 3 illustrates one example of Bluetooth communication architecture to which methods proposed in this specification may be applied.

FIG. 3 illustrates one example of Bluetooth communication architecture to which the methods proposed by the present specification may be applied.

Referring to FIG. 3, FIG. 3(a) shows an example of a protocol stack of Bluetooth Basic Rate (BR)/Enhanced Data Rate (EDR), and (b) shows an example of a protocol stack of Bluetooth Low Energy (LE).

Specifically, as illustrated in (a) of FIG. 3, the Bluetooth BR/EDR protocol stack may include an upper controller stack 10 and a lower host stack 20 with respect to a host controller interface (HCI) 18.

The host stack (or host module) 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The controller stack 10 may include a PHY 12, link controller 14, and link manager 16.

The PHY 12 is a layer transmitting and receiving a 2.4 GHz radio signal, and when Gaussian frequency shift keying (GFSK) modulation is used, the PHY layer 12 may transmit data by hopping 79 RF channels.

The link controller 14 plays the role of transmitting a digital signal, selects a channel sequence which hops 1400 times per second, and transmits a time slot having a length of 625 is for each channel.

The Link Manager layer 16 controls overall operations (link setup, control and security) of a Bluetooth connection by using a link manager protocol (LMP).

The link manager layer 16 may perform the following functions.

The link manager layer 16 may perform ACL/SCO logical transport, logical link setup, and control Detach: The link manager layer 16 stops connection and informs a counterpart device about the reason for stopping connection.

The link manager layer 16 performs power control and role switch.

The link manager layer 16 performs security (authentication, pairing, encryption) function.

The host controller interface layer 18 provides an interface between the host module and the controller module to allow the host to provide a command and data to the controller and allow the controller to provide an event and data to the host.

The host stack (or host module) 20 includes a logical link control and adaptive protocol (L2CAP) 21, an attribute protocol (ATT) 22, a generic attribute profile (GATT) 23, a generic access profile (GAP) 24, and a BR/EDR profile 25.

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The generic attribute profile (GATT) 23 may operate as a protocol how the attribute protocol 22 is used in configuring services. For example, the generic attribute profile 23 may operate how ATT attributes are grouped together with services, and operate to describe features associated with services.

Thus, the GAIT 23 and the ATT 22 may use features in order to describe status and services of a device and describe how the features are related and used.

The attribute protocol 22 and the BR/EDR profile 25 defines a service profile which uses the Bluetooth BR/EDR and an application protocol for exchanging data; and the Generic Access Profile (GAP) 24 defines device discovery, connection, and security level.

As shown in FIG. 3(b), the Bluetooth LE protocol stack includes a controller stack 30 which may be operated to process a wireless device interface for which timing is important and a host stack 40 which may be operated to process high level data.

First, the controller stack 30 may be implemented by using a communication module which may include a Bluetooth wireless device, for example, a processor module which may include a processing device such as a microprocessor.

The host stack may be implemented as part of the OS operating on the processor module or as an instantiation of a package on the OS.

In some examples, the controller stack and host stack may be operated or executed on the same processing device within the processor module.

The controller stack 30 includes a physical layer (PHY) 32, link layer 34, and host controller interface 36.

The PHY (wireless transceiver module) 32 is a layer which transmits and receives a 2.4 GHz radio signal and uses Gaussian Frequency Shift Keying (GFSK) modulation and a frequency hopping technique employing 40 RF channels.

The link layer 34, which performs the role of transmitting or receiving Bluetooth packets, performs an advertising and scanning function by using three advertising channels, generates a connection between devices, and provides a function of exchanging data packets of up to 257 bytes through 37 data channels.

The host stack may include a logical link control and adaptive protocol (L2CAP) 41, security manager (SM) 42, attribute protocol (ATT) 43, generic attribute profile (GATT) 44, generic access profile 45, and LE profile 46. However, the host stack 40 is not limited to the aforementioned description and may include various protocols and profiles.

The host stack multiplexes various protocols and profiles provided by upper Bluetooth layer by using the L2CAP.

First, the L2CAP may provide one bilateral channel for transmitting data to a specific protocol or profile.

The L2CAP 41 may operate to multiplex data among upper layer protocols, segment and reassemble packages, and manage multicast data transmission.

Bluetooth LE uses three fixed channels (one for signaling channel by default, that is, one for a security manager, one for attribute protocol), and a dynamic channel, if necessary.

Meanwhile, Basic Rate/Enhanced Data Rate (BR/EDR) uses a dynamic channel by default; and supports protocol service multiplexer, retransmission, and streaming mode.

The security manager (SM) 42 authenticates a device and manages the overall security of the Bluetooth LE as a protocol for providing key distribution.

The ATT 43 defines a rule for accessing data of a partner device in a server-client structure. ATT provides the following six message types (Request, Response, Command, Notification, Indication, and Confirmation).

① Request and Response message: Request message is a message for requesting and sending specific information from a client device to a server device, and Response message is a message responding to the Request message, which refers to a message transmitted from a server device to a client device.

② Command message: Command message is a message transmitted by a client device to a server device mainly to indicate a command for a specific operation, and the server device does not transmit a response to the command message to the client device.

③ Notification message: Notification message is a message transmitted by a server device to a client device to notify of an event, and the client device does not transmit a confirm message for the notification message to the server device.

④ Indication and confirm message: Indication and confirm message is a message transmitted by a server device to a client device to notify of an event, but differently from the notification message, the client device transmits a confirm message for the indication message to the server device.

The generic access profile 45 is a layer newly implemented for Bluetooth LE technology and is used to control role selection and multi-profile operation for communication among Bluetooth LE devices.

Furthermore, the generic access profile 45 is mainly used for device discovery, connection establishment, and security process; defines a method for providing information to the user; and defines attribute types as follows.

① Service: A combination of behaviors related to data. Defines a basic operation of a device.
② Include: Defines a relationship between services
③ Characteristics: Data values used by a service
④ Behavior: A Universal Unique Identifier (UUID)-based format which may be read by a computer The LE profile 46 comprises GATT-dependent profiles and is mainly applied to Bluetooth LE devices. For example, the LE profile 46 may have Battery, Time, FineMe, and Proximity; and specifics of the GATT-based profiles are as follows.

Battery: Method for exchanging battery
Time: Method for exchanging time information
FindMe: Provides an alarm service according to distance
Proximity: Method for exchanging battery
Time: Method for exchanging time information The GATT 44 may be operated as a protocol which describes how the attribute protocol 43 is used when services are created. For example, the GATT 44 may be operated to define how attributes are grouped into services and operated to described characteristics related to the services.

Therefore, the GATT 44 and the ATT 43 describe status of a device and services and may use characteristics to describe in which way the characteristics are related to each other and how the characteristics are used.

In what follows, procedures of Bluetooth Low Energy (BLE) technology will be described briefly.

The BLE procedure may be divided into a device filtering procedure, advertising procedure, scanning procedure, discovering procedure, and connecting procedure.

Device Filtering Procedure

The device filtering procedure is a method for reducing the number of devices performing a response with respect to a request, indication, notification, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

In this case, the advertising device refers to a device transmitting an advertisement event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

An advertising device performs an advertising procedure to perform omni-directional broadcasting to devices within coverage.

In this case, omni-directional broadcasting refers to broadcasting in all directions rather than broadcasting in specific directions.

Differently from the above, directed broadcasting refers to broadcasting in specific directions. Directed broadcasting is performed without involving a connection procedure between an advertising device and a device in a listening status (hereinafter, it is called a listening device).

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as indicated by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

Figure 4:
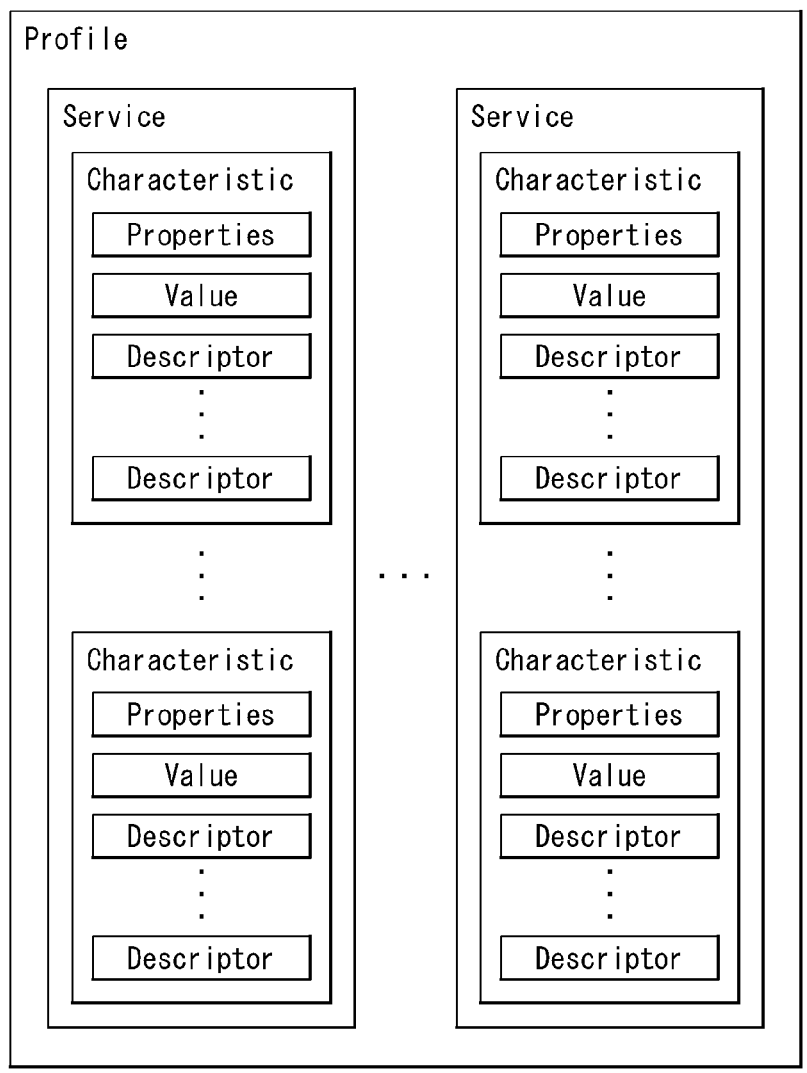
FIG. 4 illustrates one example of a generic attribute profile (GATT) structure of Bluetooth low energy technology.

FIG. 4 illustrates one example of Generic Attribute Profile (GATT) structure of Bluetooth low energy technology.

Referring to FIG. 4, a structure for exchanging profile data of Bluetooth Low Energy technology may be described.

More specifically, GATT defines a method for exchanging data by using service and characteristic between Bluetooth LE devices.

In general, a peripheral device (for example, a sensor device) plays the role of a GATT server and provides a definition about a service and characteristic; and a central device plays the role of a GATT client.

In order to read or write data, a GATT client sends a data request to the GATT server, and every operation (transaction) is started by the GATT client and a response is received from the GATT server.

Figure 5:
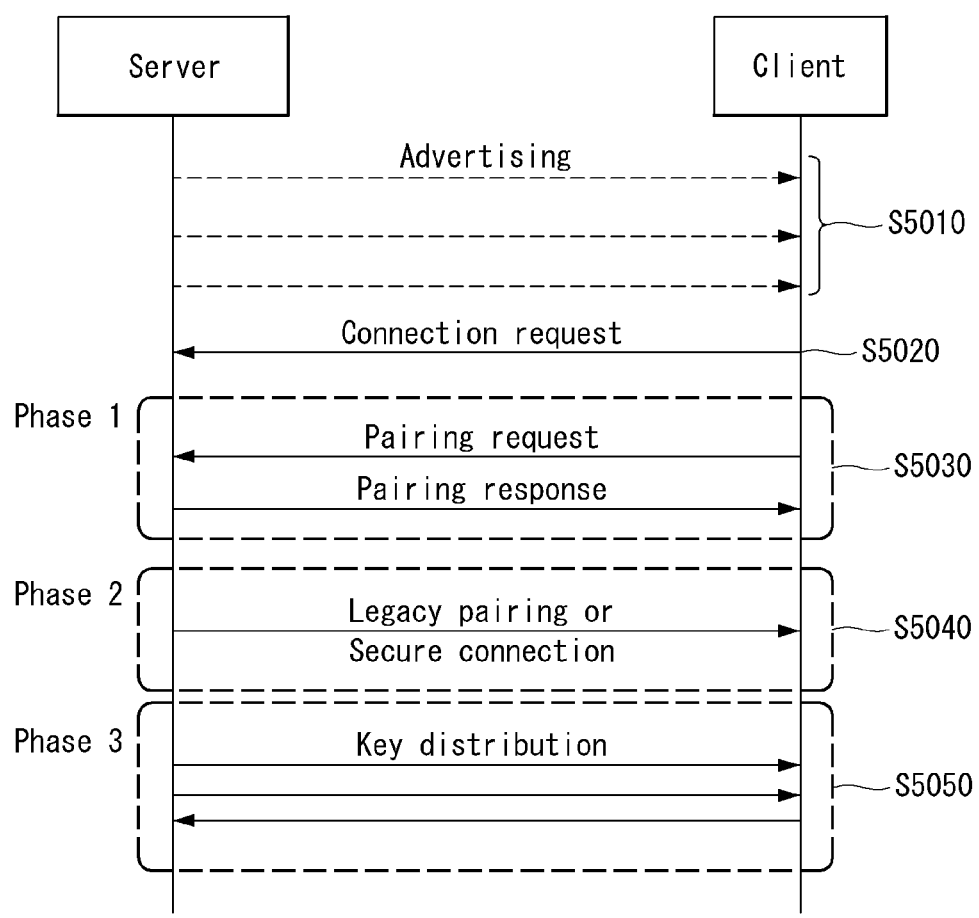
FIG. 5 is a flow diagram illustrating one example of a method for connection procedure using Bluetooth low energy technology to which the present invention may be applied.

A GATT-based operational structure used in the Bluetooth LE may be a vertical structure as illustrated in FIG. 5 on the basis of a profile, a service, and a characteristic.

The profile includes one or more services, and the services may include one or more characteristics or other services.

The service serves to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each piece of information, an attribute may be required for each information. The characteristic may use several continuous attributes.

The attribute has four components and has meanings as follows.

handle: Address of attribute
Type: Type of attribute
Value: Value of attribute
Permission: Right to access attribute FIG. 5 is a flow diagram illustrating one example of a method for connection procedure using Bluetooth low energy technology to which the present invention may be applied.

The server transmits an advertising message through three advertising channels (S5010).

The server may be referred to as an advertiser before it is connected while it may be referred to as a master after it is connected. As one example of the server, a sensor (for example, a temperature sensor) may be considered.

Furthermore, the client may be referred to as a scanner before it is connected while it may be referred to as a slave after it is connected. As one example of the client, a smartphone may be considered.

As described above, Bluetooth performs communication by dividing 2.4 GHz band into a total of 40 channels. Three out of the 40 channels are advertising channels and are used to exchange packets transmitted and received to establish a connection, including various advertising packets.

The remaining 37 channels are used for data exchange after being connected as data channels.

After receiving the advertising message, the client may transmit a scan request message to the server to obtain additional data (for example, a server device name).

In this case, the server transmits, to the client, a scan response message including additional data in response to the scan request message.

In this case, the scan request message and the scan response message are one type of the advertising packet, which may include only user data composed of 31 bytes or less.

Therefore, in the presence of data of which the size is 3 bytes but which has large overhead to be transmitted by establishing a connection, the data is transmitted twice by being divided into two smaller blocks via the scan request message/scan response message.

Next, the client transmits a connection request message for configuring a Bluetooth connection to the server (S5020).

Through the operation above, a link layer (LL) connection is established between the server and the client.

Thereafter, the server and the client perform a security establishment procedure.

A security establishment procedure may be interpreted as secure simple pairing or performed by including the secure simple pairing.

In other words, the security establishment procedure may be performed through phases 1 to 3.

More specifically, a pairing procedure (phase 1) is performed between the server and the client (S5030).

During the pairing procedure, the client transmits a pairing request message to the server, and the server transmits a pairing response message to the client.

Devices exchange information about authentication requirements, input/output (I/O) capabilities, and key size through the paring procedure. Through this information, phase 2 determines which key generation method to use.

Next, in the phase 2, legacy pairing or secure connection is performed between the server and the client (S5040).

In the phase 2, 128 bits of temporary key and short term key (STK) are created to perform the legacy pairing.

Temporary key: A key created to generate STK

Short term key (STK): A key value used for establishing an encrypted connection between devices If a secure connection is performed in the phase 2, 128 bits of long term key (LTK) is created.

Long term key (LTK): A key value used not only for an encrypted connection between devices but also for a connection Thereafter Next, in the phase 3, a key distribution procedure is performed between the server and the client (S5050).

Through the procedure, a secure connection is established between the server and the client, and an encrypted link is formed to exchange data.

In what follows, a method for transmitting and receiving a long attribute value will be described.

The longest attribute which may be transmitted in a single packet is ATT_MTU-1 octet. In this case, ATT_MTU means the largest size of a packet transmitted between a client and a server.

At least, attribute Opcode is included in an attribute PDU. The attribute value may be defined to be larger than the ATT_MTU-1 octet, and an attribute exhibiting this property is called a long attribute.

In order to read the whole value of an attribute longer than the ATT_MTU-1 octet, a read blob request message is used. By using the read blob request message, the first ATT_MTU-1 octet of a long attribute value may be read out.

In order to write the whole value of an attribute longer than the ATT_MTU-3 octet, a preparation write request message and execution write request message may be used. By using the write request message, the first ATT_MTU-3 octet of a long attribute value may be written.

It is difficult to determine whether an attribute value is longer than the ATT_MTU-3 octet which uses a specific protocol. The higher layer specification specifies that a given attribute may have the maximum length longer than the ATT_MTU-3 octet.

The maximum length of an attribute value is 512 octets. In other words, the longest length of data that may be stored in one characteristic is 512 octets.

Figure 6:
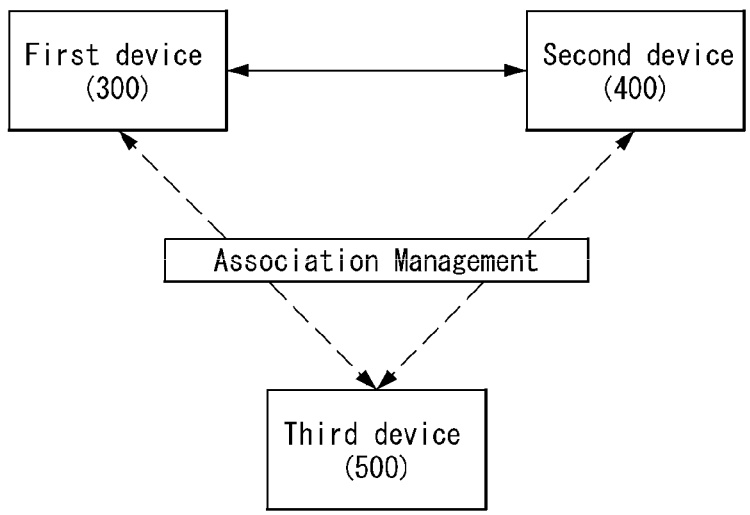
FIG. 6 illustrates a method for controlling a connection of other device through a control device, which is proposed in this specification.

FIG. 6 is a diagram showing, in brief, a method for controlling a connection of another device through a control device, which is proposed in this specification.

As shown in FIG. 6, a third device 500 is necessary to control an operation between a first device 300 and a second device 400. The third device 500 requires a new control protocol in order to control the association of the first device 300 and the second device 400.

Hereinafter, a device for controlling an operation between the first device 300 and the second device 400 is referred to as a control device, a controller, the third device 500, or a client.

Furthermore, a device controlled by the controller is referred to as a first device, a second device, or a server.

In this case, the client needs to be aware of information (e.g., association information, interface information or service information) of devices in order to control an operation between the devices.

Furthermore, if the client controls an operation between the servers by indicating a specific operation with respect to the servers, there is a problem in that whether the indicated operation has been correctly performed cannot be confirmed.

Furthermore, the client may control an operation between the devices, but cannot set the execution time of an indicated operation. If an operation has failed, there is a problem in that the client cannot specifically recognize a failed service and cause.

Accordingly, the present invention proposes a method of recognizing, by a client, information related to the association of servers, controlling an operation between the servers by indicating a specific operation with respect to the servers and an execution time, and receiving an error code for identifying an operation by performed by a server and a failure cause if the server has failed in the execution of the specific operation.

Figure 7:
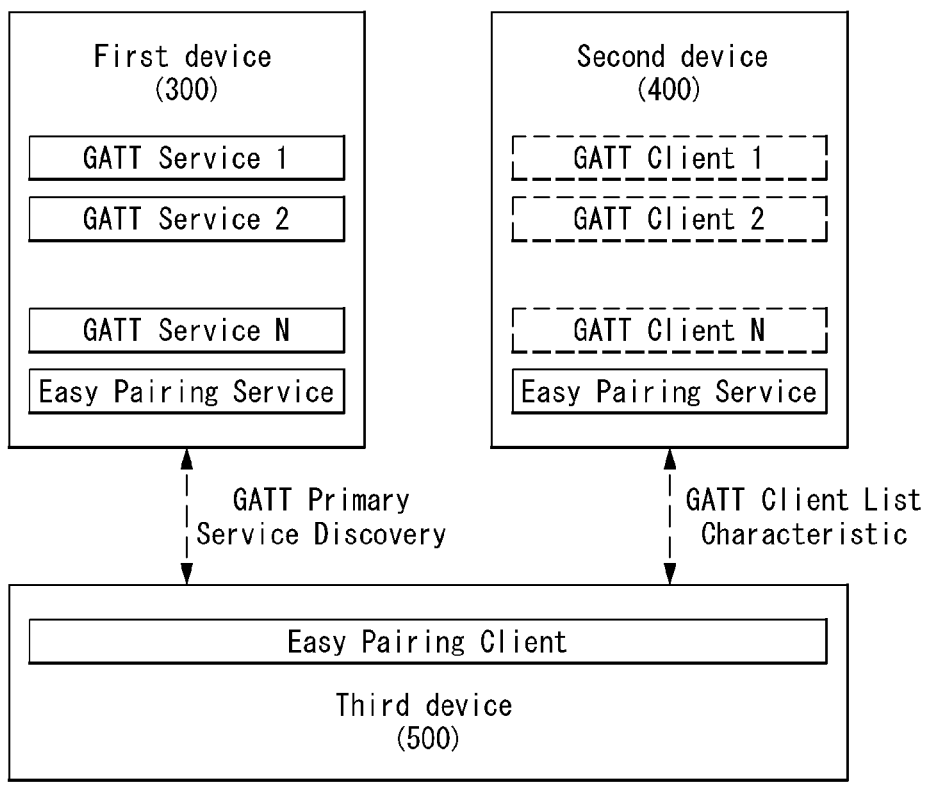
FIG. 7 illustrates one example of a profile structure for providing a service for controlling a device, which is proposed in this specification.

FIG. 7 shows an example of a profile structure for providing a service for controlling a device, which is proposed in this specification.

In Bluetooth, a service which enables a specific device to control and manage the pairing and/or association of another Bluetooth device is called an Easy Pairing Service. In FIG. 7, a controller 500 may control pairing and/or association between a first device 300 and a second device 400 using the Easy Pairing Service.

Referring to FIG. 7, the controller 500 may associate the first device 300 and the second device 400 through the Easy Pairing Service.

Specifically, the controller 500 may search for GATT Services of the first device 300 through a Primary Service Discovery procedure. The third device may discover GATT Clients of the second device 400, that is, a peer device of the first device 300, along with characteristics.

Accordingly, the controller 500 can be aware of GATT services available between the first device 300 and the second device 400.

The controller 500 may control pairing and/or association between the first device 300 and the second device 400 based on GATT services available between the first device 300 and the second device 400.

In the Easy Pairing Service, the controller 500 may manage pairing and/or association based on what the first device 300 and the second device 400 form which association relation with which device.

In Bluetooth, 1 to 1 association is a base. However, one device may have an association relation with multiple devices through Bluetooth subsequently. That is, 1-to-many association may be possible.

Figure 8:
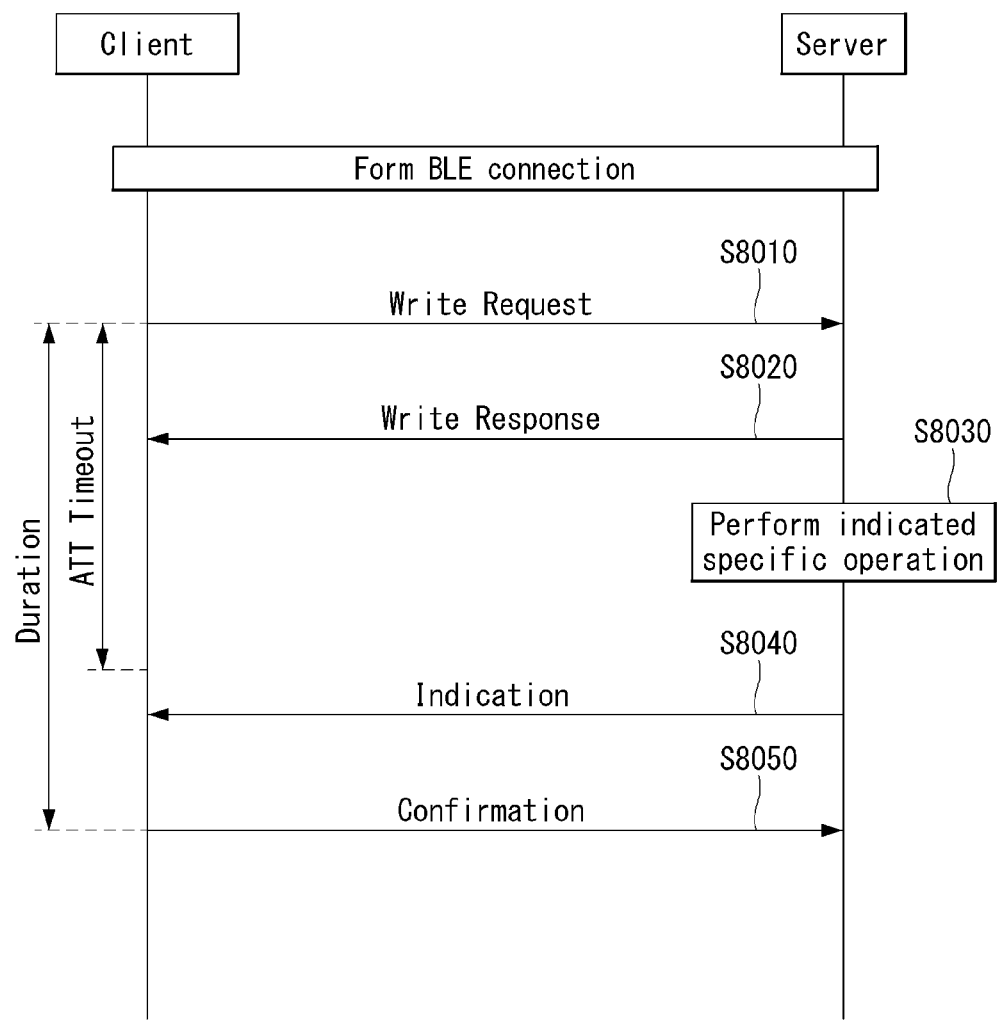

FIG. 8 is a flowchart showing an example of a method for controlling, by a client, a server, which is proposed in this specification.

Referring to FIG. 8, the client may set the execution time of a specific operation, while indicating the specific operation with respect to the server. The server may perform the indicated specific operation based on the set execution time.

Specifically, the client may form Bluetooth LE connection with the server through the method described in FIG. 5.

Thereafter, the client transmits, to the server, a write request message to request the writing of a control point characteristic of the server in order to a specific operation with respect to the server (S8010).

The write request message may include an operation code (Opcode) indicative of the specific operation indicated by the client and an effective time related to the execution of the specific operation.

FIG. 9 shows an example of operation codes which may be indicated with respect to a server by a client.

A server needs to perform an indicated specific operation during an effective time or within an effective time set by a client according to the indicated specific operation.

For example, if an operation code included in a write request message is "0x04", that is, if an indicated operation is a peripheral role for LE connection, a server may transmit an advertising packet to peripheral devices during an effective time.

Alternatively, if an operation code included in a write request message is "0x06", that is, if an indicated operation is an operation of selecting one of a plurality of banks indicative of the association relation of a server, the server may select one of specific banks within an effective time.

In this case, the bank may mean each of data split from association information configured based on a maximum size, if the configured association information exceeds the maximum size which may be stored in one characteristic.

A control point characteristic may be identified by a UUID, and may have a structure, such as Table 2.

TABLE 2

|  | Opcode | Parameters |
| --- | --- | --- |
| Octet Order | None | LSO . . . MSO |
| Data Type | 8 bits | Variable |
| Size | 1 octet | 1 octet-X octets |
| Unit | None | None |

In Table 2, Opcode includes a code indicative of an indicated operation, as shown in FIG. 9, and Parameters include parameters related to operations indicated by Opcode.

The Parameters may include pieces of information related to a specific operation indicated by Opcode. For example, Parameters may include an Operation Field indicative of operations that need to be performed in order to perform a specific operation indicated by Opcode, and an Effective Time Field indicative of an execution time during which a specific operation continues to be performed or an execution time during which a specific operation needs to be performed.

Furthermore, Parameters may further include an additional field according to an indicated operation.

When the server receives the write request message from the client, it writes received values in a control point characteristic before ATT timeout indicative of a response time expires, and transmits a write response message to the client as a response to the write request message (S8020).

In this case, if the server cannot write the values, received through the write request message of the client, in the control point characteristic, it may transmit an error response message to the client before ATT timeout expires.

After transmitting the write response message to the client, the server may perform a specific operation indicated by the client (S8030).

If the server cannot perform an operation indicated by the client, it may transmit an error message, including a response code indicative of an operation that cannot be performed and/or an error cause which are shown in FIGS. 9 and 10.

FIGS. 9 and 10 show examples of a response code.

The server performs the indicated specific operation during an effective time or within an effective time written through the write request message, and may transmit, to the client, an indication message indicative of the successful execution of the specific operation (S8040).

In this case, the indication message may be transmitted from the server to the client before the effective time expires.

The client that has received, from the server, the indication message indicative of the successful execution of the specific operation transmits a confirm message to the server as a response thereto (S8050).

Hereinafter, as a detailed embodiment of FIG. 8, each of operations of the server for "Opcode" shown in FIG. 9 is described.

BR/EDR Acceptor Control Procedure

A client may be aware of an operation and function, supported by a server, through a read procedure. If the server can operate as an Acceptor of BR/EDR, the client may indicate that the server operates as the Acceptor through the writing of a control point characteristic of the server.

Specifically, if the Opcode of the control point characteristic of the server is written as "0x01" by the client, the server operates as the Acceptor of BR/EDR.

In this case, the parameters of the control point characteristic of the server may be configured like Table 3.

TABLE 3

|  | Operations | Effective Time | Peer Device ID |
| --- | --- | --- | --- |
| Octet Order | LSO . . . MSO | LSO . . . MSO | LSO . . . MSO |
| Data Type | 8 bits | 16 bits | 48 bits |
| Size | 1 octet | 2 octets | 6 octets |
| Unit | None | None | None |

In Table 3, the Peer Device ID field includes an ID which enables the server to identify a target device to be associated by performing an Acceptor role.

The Operation field may include operations related to the Acceptor role like Table 4.

TABLE 4

| Bit | Definition of Operation |
| --- | --- |
| 0-1 | Server shall operate the Discoverable Mode.<br>00b: Non-Discoverable Mode<br>01b: Limited Discoverable Mode<br>10b: General Discoverable Mode<br>11b: Reserved for Future Use |
| 2 | Server shall operate the Bondable Mode. |
| 3 | Server shall operate with a Peer Device whose Bluetooth address is same as the following Peer Device ID field. |
| 4 | Server shall indicate its Confirm Value to Client with Confirm Value Indication. |
| 5 | Server shall wait to receive the Confirm Value of the peer Server via the Client with the Confirm Value Relay. |
| 6-7 | Reserved for Future Use |

When a server receives a write request message from a client, it needs to be configured in an accessible mode in order to perform a page scan operation, and may be configured in a discoverable mode and a bondable mode as defined in the bits 0, 1 and 2 of Table 4.

Additionally, in the bits 3, 4, and 5 of Table 4, when each bit is set to 1b, a server may perform each calculation. If not, the server should not perform an indicated operation.

When the bit 3 of Table 4 is set to 1b, a server may perform an Acceptor role only in a device whose Bluetooth address has the same value as a Peer Device ID field. If not, the Peer Device ID field is not included, the server may perform an Acceptor role in a relation with all devices.

In order to set the bits 3 and 4 or 4 and 5 to 1b, a client should be associated with two servers.

When the bit 4 is set to 1b, a server generates a confirm value (agreed value of BR/EDR) and a given value, and indicates that a client should relay the generated values to a peer device along with Confirm Value Indication Opcode.

When the bit 5 is set to 1b, a server waits to receive, from a client, Confirm Value Relay Opcode and a given value of a peer device in order to form security association with the peer device.

Table 5 shows an example of the effective time field.

TABLE 5

| Bit | Definition of Effective Time |
| --- | --- |
| 0-7 | Time Unit subfield:<br>0x00: Pre-defined Time<br>0x01: Second<br>0x02: Minute<br>0x03-0xFF: Reserved for Future Use |
| 8-15 | Duration value subfield:<br>0x00: Prohibited<br>0x01-0xFF |

A server needs to perform an indicated operation during the following effective operation time based on a value of the effective time field.

Effective operation time=time unit×duration value

When a value of the time unit subfield is "0x00", a server neglects a value of the Duration Value subfield, and may perform a requested operation during the time defined in a higher layer or implementation.

If a server has successfully performed a related operation in response to the indication of a client, it transmits, to the client, an indication message including a response code indicating that the indicated operation has been successfully executed.

However, if the server has not performed the indicated operation, the server transmits, to the client, an indication message including a response code indicating a failure cause shown in FIGS. 10 and 11.

BR/EDR Initiator Control Procedure Behavior

If a client recognizes that a server supports an Initiator role through a read procedure, the client may indicate that the server should operate as an Initiator through the writing of a control point characteristic of the server.

Specifically, if Opcode of a control point characteristic of the server is written as "0x02" by a client, the server operates as the initiator of BR/EDR.

In this case, the parameters of the control point characteristic of the server may be configured like Table 3. The Operation field may include operations related to the Initiator role like Table 6.

TABLE 6

| Bit | Definition of Operations |
| --- | --- |
| 0 | Server shall perform the Bonding procedure. |
| 1 | Server shall indicate the Confirm Value Indication to its Client. |
| 2 | Server shall wait to receive the Confirm Value Relay from its Client. |
| 3-7 | Reserved for Future Use |

When the bit 1 of the Operation field is set to "0b", a server performs a bonding procedure. If not, the server performs a bonding procedure based on a higher layer specification or implementation.

In order for the bit 1 or 2 to be set to "1b", a client needs to be associated with two servers and to have confirm values exchanged between one server and the other server.

A server generates a confirm value (confirm value of BR/EDR) and a given value, and indicates that a client should relay the generated values to a peer device along with Confirm Value Indication Opcode.

When the bit 2 is set to 1b, a server waits to receive Confirm Value Relay Opcode and a given value of a peer device from a client in order to form security association with the peer device.

The following operation may be the same as the case where the server operates as an Acceptor.

LE Peripheral Control Procedure Behavior

If a client recognizes that a server supports an LE Peripheral role through a read procedure, the client may indicate that the server should operate as an LE Peripheral role through the writing of a control point characteristic of the server.

Specifically, if the Opcode of the control point characteristic of the server is written as "0x03" by the client, the server operates as an LE Peripheral of BR/EDR.

In this case, the parameters of the control point characteristic of the server may be configured like Table 7. The Operation field may be configured like Table 8.

TABLE 7

| | Operations | Effective Time | Peer Device ID | Peer Device IRK |
| --- | --- | --- | --- | --- |
| Octet Order | LSO . . . MSO | LSO . . . MSO | LSO . . . MSO | LSO . . . MSO |
| Data Type | | | | |
| Size | 24 bits | 16 bits | 48 bits | 128 bits |
| | 3 octets | 2 octets | 6 octets | 16 octets |
| Unit | None | None | None | None |

TABLE 8

| Bit | Definition of Operations |
| --- | --- |
| 0 | Server operates the Discoverable Mode.<br>0b: Limited Discoverable Mode<br>1b: General Discoverable Mode |
| 1 | Reserved for Future Use |
| 2 | Server shall operate the Connectable Mode.<br>0b: Directed Connectable Mode<br>1b: Undirected Connectable Mode |
| 3 | Reserved for Future Use |
| 4-5 | Server shall use the following address type for its Advertiser's Address.<br>00b: Public Device Address<br>01b: Static Device Address<br>10b: Non-Resolvable Private Address<br>11b: Resolvable Private Address |

TABLE 8-continued

| Bit | Definition of Operations |
|---|---|
| 6 | Reserved for Future Use |
| 7 | Server shall operate the Bondable Mode.<br>0b: Non-Bondable Mode<br>1b: Bondable Mode |
| 8 | Reserved for Future Use |
| 9 | Server shall indicate its Confirm Value to Client with Confirm Value Indication. |
| 10 | Server shall receive the Confirm Value of the peer Server via the Client with the Confirm Value Relay. |
| 11 | Reserved for Future Use |
| 12 | Peer Device IRK field is attached. |
| 13-23 | Reserved for Future Use |

Referring to Table 8, a server may be configured in a discoverable mode by the bit 0 of the operation field, and may be configured in a connectable mode by the bit 2 of the operation field.

For example, when the bit 2 of the operation field is set to "1b", the server may directly operate in the connectable mode using a value of the Peer Device ID field as the address of an initiator.

A server may advertise the type of its own advertiser address as defined by in the bits 4 and 5 of the operation field of Table 8.

If the server includes a Resolvable Private Address Only Characteristic, the server may advertise the type of its own advertiser address along with its own Resolvable Private Address (RPA).

If a peer device does not have the IRK of the Resolvable Private Address, the peer device neglects the advertising transmitted by the server.

A server may be configured in a bondable mode by the bit 7 of the operation field. If the server is not configured by the bit 7 of the operation field, it may be configured in a bondable mode based on a higher layer specification or implementation.

In order for the bit 9 or bit 10 of the operation field to be set to "1b", a client needs to be associated with two servers and to have confirm values exchanged between one server and the other server.

A server generates a confirm value and a given value, and indicates that a client should relay the generated values to a different server through Confirm Value Indication Opcode.

When the bit 10 is set to "1b", a server waits to receive Confirm Value Relay Opcode and a given value of a peer device from a client in order to form security association with the peer device.

When the bit 14 is set to "1b", a server receives a peer device IRK field, that is, an IRK value of a Peer Device ID field. The server adds a Peer Device ID, Peer Device IRK and local IRK to a resolving list.

Hereinafter, an effective time and an operation related to the success or failure of an operation may be the same as those described above.

LE Central Control Procedure Behavior

If a client recognizes that a server supports an LE Central role through a read procedure, the client may indicate that the server should operate as the LE Central role through the writing of a control point characteristic of the server.

Specifically, if Opcode of the control point characteristic of the server is written as "0x04" by the client, the server operates as LE Central of BR/EDR.

In this case, the parameters of the control point characteristic of the server may be configured like Table 9, and Operation field may be configured like Table 10.

If a server supports a Resolvable Private Address, the server may also receive Peer Device IRK through a subprocedure, such as Write Long Characteristic Values capable of transmitting and receiving data having a long length.

TABLE 9

| | Operations | Effective Time | Peer Device ID | Peer Device IRK |
|---|---|---|---|---|
| Octet Order | LSO ... MSO | LSO ... MSO | LSO ... MSO | LSO ... MSO |
| Data Type | 16 bits | 16 bits | 48 bits | 128 bits |
| Size | 2 octets | 2 octets | 6 octets | 16 octets |
| Unit | None | None | None | None |

TABLE 10

| Bit | Definition of Operations |
|---|---|
| 0-1 | Server shall operate the Connection Establishment Procedure.<br>00b: Auto Connection Establishment Procedure<br>01b: General Connection Establishment Procedure<br>10b-11b: Reserved for Future Use |
| 2 | Reserved for Future Use |
| 3 | Server shall operate the Bonding Procedure. |
| 4 | Reserved for Future Use |
| 5 | Server shall indicate its Confirm Value to Client with Confirm Value Indication. |
| 6 | Server shall receive the Confirm Value of the peer Server via the Client with the Confirm Value Relay. |
| 7 | Reserved for Future Use |
| 8-9 | Server shall use the following address type for its Initiator Address.<br>00b: Public Device Address<br>01b: Static Device Address<br>10b: Non-Resolvable Private Address<br>11b: Resolvable Private Address |
| 10 | Reserved for Future Use |
| 11 | Peer Device IRK field is attached. |
| 12-15 | Reserved for Future Use |

If association with a server may be formed according to a procedure configured by the bits 0 and 1 of the operation field. If the bit 3 is set to "1b", the server may perform a bonding procedure in order to store bonding information for next association with a peer device according to a pairing procedure.

If the bits 5 and 6 of the operation field are set to "1b", a client may be associated with two servers. The client needs to have confirm values exchanged between one server and the other server.

When the bit 5 is set to "1b", one server generates a confirm value and a given value, and indicates that a client should relay the generated values to the other server through Confirm Value Indication Opcode.

When the bit 10 is set to "1b", a server waits to receive Confirm Value Relay Opcode and a given value of a peer device from a client in order to form security association with the peer device.

When the bit 14 is set to "1b", a server receives a peer device IRK field, that is, an IRK value of a Peer Device ID field. The server adds a Peer Device ID, Peer Device IRK and local IRK to a resolving list.

Hereinafter, an effective time and an operation related to the success or failure of an operation may be the same as those described above.

Association Termination Procedure Behavior

If a client recognizes that a server supports an Easy Pairing service through a read procedure, the client may indicate that the server should perform an association termination procedure of terminating association with other devices through the writing of a control point characteristic of the server.

The association termination procedure may be performed to release the association of the server, including association termination and the deletion of bonding.

In this case, the parameters of the control point characteristic of the server may be configured like Table 11.

TABLE 11

|  | Peer Device ID | Bearers | Operations |
|---|---|---|---|
| Octet Order | LSO . . . MSO | LSO . . . MSO | LSO . . . MSO |
| Data Type | 48 bits | 8 bits | 8 bits |
| Size | 6 octets | 1 octet | 1 octet |
| Unit | None | None | None |

The Bearers field of Table 11 may be configured with the values of Table 12.

TABLE 12

| Value | Definition |
|---|---|
| 0x00 | BR/EDR is released |
| 0x01 | LE is released |
| 0x02 | BR/EDR and LE are released together |
| 0x03-0xFF | Reserved for Future Use |

A server may release a bearer based on a value set in the Bearers field of Table 11. If a value of the Bearers field is set to a value indicative of "Reserved for Future" of Table 12, the server may transmit, to a client, an error message including a response code having a value of "0x08" of FIG. 10.

The server may operate based on a value set in the operation field of Table 11.

Table 13 shows an example of operations indicated by the respective bits of the operation field.

TABLE 13

| Bit | Definition of Operations |
|---|---|
| 0 | Server shall terminate its connection with specific device. |
| 1 | Server shall delete the bonding information with specific device after the connection of the requested association is no longer active. |
| 2-7 | Reserved for Future Use |

Hereinafter, the operation of a server according to the success or failure of an operation is the same as that described above.

Confirm Value Indication Opcode Behavior

Confirm Value Indication Opcode may be used to form security association between two servers.

If a server supports Confirm Value Indication Opcode, the serve needs to support a Read Long Characteristic Values lower procedure for transmitting and receiving data having a long length although ATT_MTU is smaller than 41 bytes.

In this case, ATT_MTU means a maximum size of packets transmitted between the client and the server.

Two servers may be associated with a client through BR/EDR Secure Simple Pairing, a BR/EDR Secure Connection or an LE Secure Connection pairing procedure. Confirm Value Indication Opcode may be supported along with The Confirm Value Relay Opcode below.

As described above, a server generates a confirm value (Commitment value in BR/EDR) and a given value, and may indicate that a client performs an operation according to the above-described procedures through Confirm Value Indication Opcode.

Thereafter, a peer server receives the following Confirm Value Relay Opcode from the client. The two servers establish security association when the relayed confirm value is confirmed.

Confirm Value Relay Opcode Behavior

Confirm Value Relay Opcode may be used for a client to establish security association between two servers.

If a server supports Confirm Value Indication Opcode, the server needs to support a Read Long Characteristic Values lower procedure for transmitting and receiving data having a long length although ATT_MTU is smaller than 41 bytes.

Furthermore, in order for a client to form security association between servers through Confirm Value Relay Opcode, the two servers need to have been associated with the client through BR/EDR Secure Simple Pairing, BR/EDR Secure Connections, or LE Secure Connections Pairing.

Confirm Value Indication Opcode may be supported along with the above-described Confirm Value Indication Opcode.

If a server configures that a client should perform Confirm Value Indication Opcode in a procedure next to the above-described procedures, the server waits to receive Confirm Value Indication Opcode.

A peer server needs to indicate its own confirm value and a given value with respect to the client through the above-described Confirm Value Indication Opcode before the server receives the Confirm Value Indication Opcode from the client.

Thereafter, when the confirm value is confirmed, security association may be established between the server and the peer server.

Table 13 shows an example of the parameters of the control point characteristic of a server if a Confirm Value Relay procedure is performed through Confirm Value Indication Opcode and Confirm Value Relay Opcode.

TABLE 14

|  | Device Address | Random Value | Confirm Value |
|---|---|---|---|
| Octet Order | LSO . . . MSO | LSO . . . MSO | LSO . . . MSO |
| Data Type | 48 bits | 128 bits | 128 bits |
| Size | 6 octets | 16 octets | 16 octets |
| Unit | None | None | None |

If the client cannot relay, to the server, the confirm value and given value of the peer server along with Confirm Value Relay Opcode, the server may receive, from the client, an operation code indicative of the stop of the procedure, and may abort the progress of a related procedure.

Control Point Response Indication Opcode Behavior

Control Point Response Indication Opcode may be used to indicate the success or failure of the above-described procedures. Response codes shown in FIG. 10 and/or FIG. 11 may be used according to the respective procedures.

Table 14 shows an example of the parameters of the control point characteristic of a server if a Control Point Response Indication procedure is performed.

TABLE 15

| | Opcode of Requested Procedure | Response Code | Additional Parameter |
|---|---|---|---|
| Octet Order | LSO . . . MSO | LSO . . . MSO | LSO . . . MSO |
| Data Type | 8 bits | 8 bits | Variable |
| Size | 1 octets | 1 octet | Variable |
| Unit | None | None | Dynamic |

An indication message, including a response code indicating a result of the execution of an operation for an operation indicated or requested by a client, may include an operation code indicative of the operation requested by the client as in Table 15.

If a server has successfully performed the operation requested by the client, it may use "0x00" indicative of the success of the operation as the response code. However, if the server has failed in the operation requested by the client, it may select a response code indicative of the failure and the failure cause of the operation from the response codes shown in FIGS. 10 and 11, and may use the selected response code.

If an error situation has occurred while a server performs a specific operation or a specific procedure requested by a client, it may abort operations related to the specific operation or specific procedure, may select a response code most related to the error among the response codes shown in FIGS. 10 and 11, and may transmit the response code to the server.

If a server does not support an effective time set by a client, the server may transmit, to the client, its supported effective time along with a response code.

For example, if an effective time transmitted by a client is greater than a maximum operation time permitted by a server, the server may transmit, to the client, a maximum operation time supported by the server.

Furthermore, if an effective time transmitted by the client is smaller than a minimum operation time permitted by the server, the server may transmit, to the client, a minimum operation time supported by the server.

A server cannot perform another operation until an operation indicated by a client is terminated.

Accordingly, if the server receives indication for a specific operation and/or procedure from a different client while it performs an operation indicated by the client, the server may include a response code, indicating that the operation has not been completed, in an error message, and may transmit the error message to the different client.

Select Client List Bank Procedure Behavior

If a server can provide the client list of associated clients through a characteristic, it may perform a procedure for changing a bank in client list characteristic in which a bank meaning each of a plurality of data indicative of the list of associated client is stored.

The procedure for changing a bank in such a characteristic is called a Select Client List Bank Procedure.

A client may control a server so that a bank stored in the client list characteristic of the server is changed into a next bank or a specific bank through Select Client List Bank Opcode.

The serer that has received Select Client List Bank Opcode from the client may change a value of the client list characteristic into a next bank or a requested bank.

If the server does not have a bank requested by the client, the server may include "0x07", that is, a response code indicative of a not-supported bank, in an error message, and may transmit the error message to the client.

Table 16 shows an example of the parameters of the control point characteristic of a server if a Select Client List Bank procedure is performed.

TABLE 16

| | Bank Counter |
|---|---|
| Octet Order | LSO . . . MSO |
| Data Type | 8 bits |
| Size | 1 octet |
| Unit | None |

As in the above-described procedures, if an operation has been successfully performed, the server transmits, to the client, a response code indicative of a success. If the operation has failed, the server includes a response code indicative of a failure and a failure cause in an error message, and transmits the error message.

Reset Client UUID Selection Policy Info Procedure Behavior

If a server can provide a list of associated clients through a client list characteristic, Client UUID Selection Policy Information meaning a policy for selecting a client UUID may be reset through a Reset Client UUID Selection Policy Info Procedure.

The server that has received an operation code for resetting Client UUID Selection Policy Information may reconfigure all types of information related to the client UUID selection policy (e.g., how often is a client function used in the server if the client function is used in the server).

As in the above-described procedures, if an operation has been successfully performed, the server transmits, to the client, a response code indicative of a success. If the operation has failed, the server includes an response code indicative of a failure and a failure cause in an error message, and transmits the error message.

Abort Opcode

A client may abort the above-described operations using Abort Opcode.

When a server receives the Abort Opcode from the client, it immediately aborts all operations related to a specific operation and/or procedure indicated by the client, includes "0x11", that is, a response code indicating the cancellation of the procedure shown in FIG. 10, in an indication message, and transmits the indication message.

The Abort Opcode needs to be received by the server before the operation indicated by the client is completed. If the Abort Opcode is received after the operation indicated by the client is completed, the server neglects the Abort Opcode and does not transmit the response code of "0x11."

General Error Handling Procedures for Write Requests of the Pairing Control Point Characteristic In general, the following error processing procedure may be applied in addition to a procedure for an error of the above-described specific procedure.

If the operation code of the control point characteristic of a server is written by a client and the characteristic configuration descriptor of a control point is not configured for indications, the server transmits, to the client, an error message including an error code indicating that the characteristic configuration descriptor has not been properly configured.

Figure 12:
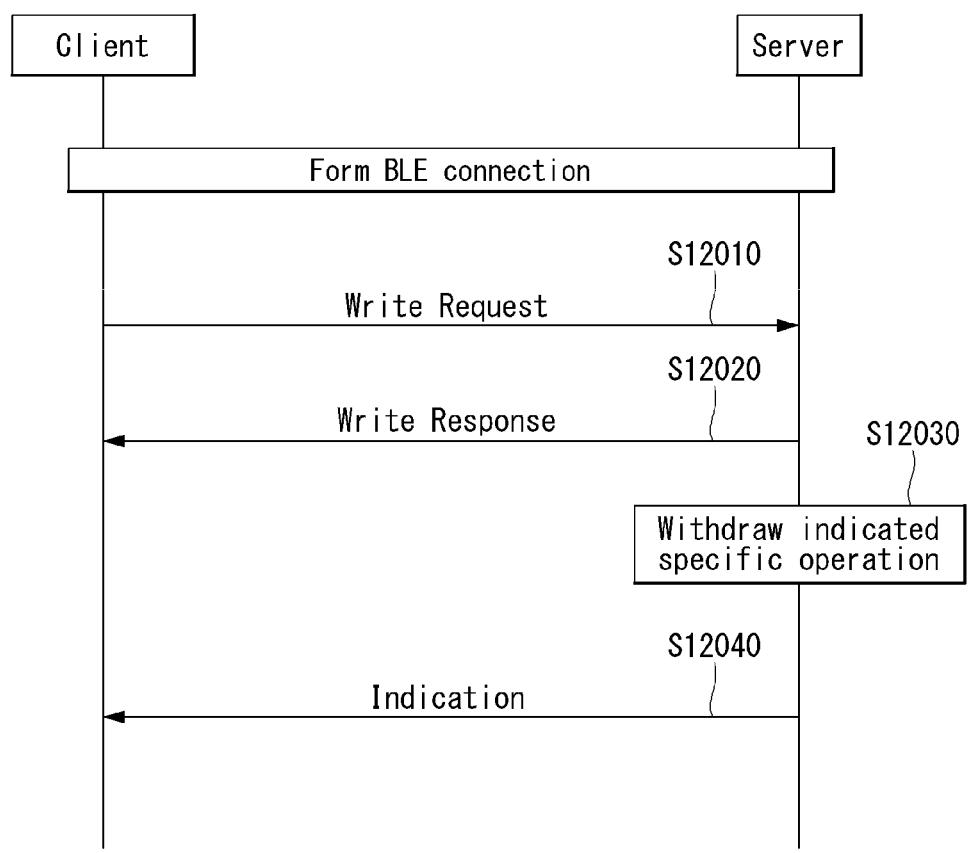
FIG. 12 is a flowchart showing an example of a method for aborting an operation indicated by a client, which is proposed in this specification.

FIG. 12 is a flowchart showing an example of a method for aborting an operation indicated by a client, which is proposed in this specification.

Referring to FIG. 12, the client may withdraw the operation of the server by indicating the withdrawal of the operation before the operation indicated in the server is terminated.

Specifically, if a client wants to withdraw an indicated operation after it indicates a specific operation with respect to a server through the method described in FIGS. 8 to 11, the client transmits, to the server, a write request message to request the writing of a control point characteristic for indicating the withdrawal of an operation (S12010).

In this case, the write request message may include Abort Opcode, that is, an operation code indicative of the withdrawal of the operation described in FIGS. 8 to 11.

The write request message to request the withdrawal of the operation needs to be received by the server before the operation indicated by the client is terminated. If the write request message to request the withdrawal of the operation is received by the server after the indicated operation is completed, the server may neglect the received write request message as described above.

After receiving the write request message from the client, the server transmits a write response message as a response thereto, and withdraws all procedures being performed in relation to the indicated operation and/or procedure (S12020, S12030).

Thereafter, if the withdrawal of the operation has been successfully executed, the server may transmit, to the client, an indication message including a response code indicating that the operation has been successfully withdrawn (S12040).

Through such a method, a client can withdraw an operation, indicated with respect to a server, before the indicated operation is terminated.

Figure 13:
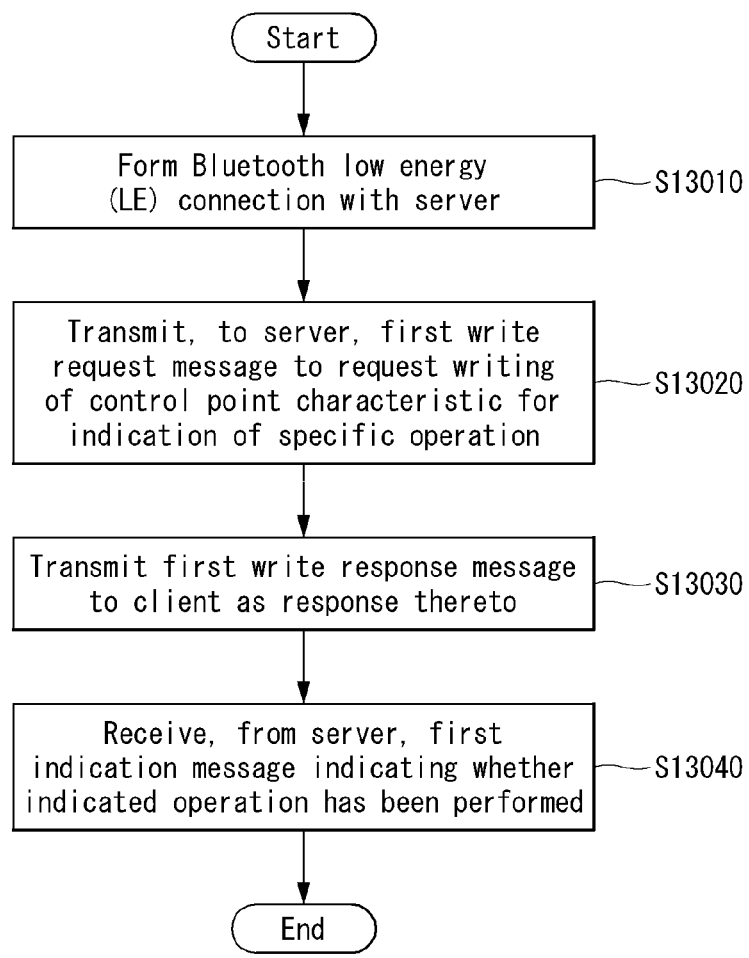
FIG. 13 is a flowchart showing an example of a method for controlling, by a client, a server, which is proposed in this specification.

FIG. 13 is a flowchart showing an example of a method for controlling, by a client, a server, which is proposed in this specification.

Referring to FIG. 13, the client forms a Bluetooth low energy (LE) connection with the server in order to control the server through a specific service (S13010). In this case, the Bluetooth connection may be formed through the method described in FIG. 5.

Thereafter, the client transmits, to the server, a first write request message to request the writing of a control point characteristic for the indication of a specific operation (S13020).

The first write request message may include at least one of an operation code indicative of the specific operation or a first effective time indicative of the execution time of the specific operation or related parameters in the same manner as those described in FIGS. 8 to 11.

After receiving the first write request message from the client, the server transmits a first write response message to the client as a response thereto (S13030).

In this case, the first write response message needs to be transmitted to the client within a specific time.

Thereafter, the client receives, from the server, a first indication message indicating whether the indicated operation has been performed (S13040).

In this case, the first indication message may include a response code indicative of the success or failure of the indicated operation as described in FIGS. 9 to 11, and needs to be transmitted from the server to the client within the effective time.

Furthermore, the drawings have been divided and described for convenience of description, but the embodiments described with reference to the drawings may be merged to implement a new embodiment. Furthermore, to design a computer-readable recoding medium on which a program for executing the above-described embodiments has been recorded according to the needs of a person having ordinary skill in the art falls within the scope of the present invention.

The apparatus and method according to this specification are not limitedly applied to the elements and methods according to the above-described embodiments, and some of or all the above-described embodiments may be selectively combined and configured so that the embodiments are modified in various manners.

Meanwhile, the method of this specification may be implemented in a processor-readable recording medium included in a network device, in the form of processor-readable code. The processor-readable recording medium includes all types of recording devices in which data readable by a processor is stored. The processor-readable recording medium may include ROM, RAM, CD-ROM, magnetic tapes, floppy disks, and optical data storage devices, for example. Furthermore, the processor-readable recording medium may be implemented in the form of carrier waves, such as transmission through the Internet. Furthermore, the processor-readable recording medium may be distributed to computer systems connected over a network, and the processor-readable code may be stored and executed in a distributed manner.

Furthermore, although the preferred embodiments of this specification have been illustrated and described above, this specification is not limited to the above-described specific embodiments, and a person having ordinary skill in the art to which the present invention pertains may modify this specification in various ways without departing from the gist of the present invention in the present invention. Such modified embodiments should not be individually understood from the technical spirit or prospect of the present invention.

Furthermore, in this specification, both the apparatus invention and the method invention have been described, but the descriptions of both the inventions may be complementary applied, if necessary.

INDUSTRIAL APPLICABILITY

The data transmission and reception method of the present invention has been illustrated as being applied to Bluetooth LE, but may be applied to various wireless communication systems in addition to the Bluetooth LE system.

The invention claimed is:

1. A method of controlling, by a client, a server in Bluetooth, the method comprising:
    forming a Bluetooth low energy (LE) connection with the server;
    transmitting, to the server, a first write request message to request a writing of a control point characteristic for an indication of a specific operation;
    receiving a first write response message as a response to the first write request message; and
    receiving, from the server, a first indication message for indicating whether the specific operation has been executed,
    wherein the first write request message comprises a first operation code indicating the specific operation and a first effective time indicating an execution time of the specific operation, and
    wherein the receiving the first indication message includes:

confirming a failure cause based on that the execution of the specific operation; and receiving the first indication message which comprises a second effective time supported by the server based on that an error code indicates non-support for the first effective time.

2. The method of claim 1, wherein if the specific operation has been successfully executed, the first indication message comprises a response code indicating the success of the specific operation.

3. The method of claim 1, wherein if the first effective time is greater than a maximum execution time of the specific operation, the second effective time indicates the maximum execution time, and wherein if the first effective time is smaller than a minimum execution time of the specific operation, the second effective time indicates the minimum execution time.

4. The method of claim 1, further comprising:

transmitting, to the server, a second write request message to request the writing of the control point characteristic in order to indicate a cancellation of the specific operation;

receiving a second write response message as a response to the second write request message; and receiving, from the server, a second indication message indicating whether the specific operation has been aborted, wherein the second write request message comprises a second operation code indicating the cancellation of the specific operation.

5. The method of claim 1, wherein if the specific operation is an operation performed along with another device, the first write request message further comprises a device ID for identifying a peer device.

6. A client for controlling a server in Bluetooth, the client comprising:

a communication unit configured to communicate with at least one external device in a wired or wireless manner;

a memory configured to store data; and a processor functionally connected to the communication unit, wherein the processor is configured to:

form a Bluetooth low energy (LE) connection with the server;

transmit, to the server, a first write request message to request a writing of a control point characteristic for an indication of a specific operation;

receive a first write response message as a response to the first write request message; and receive, from the server, a first indication message for indicating whether the specific operation has been executed, wherein the first write request message comprises a first operation code indicating the specific operation and a first effective time indicating an execution time of the specific operation, and wherein the receiving of the first indication message by the processor includes:

confirming a failure cause based on that the execution of the specific operation; and receiving the first indication message which comprises a second effective time supported by the server based on that an error code indicates non-support for the first effective time.

7. The client of claim 6, wherein if the specific operation has been successfully executed, the first indication message comprises a response code indicating the success of the specific operation.

8. The client of claim 6, wherein if the first effective time is greater than a maximum execution time of the specific operation, the second effective time indicates the maximum execution time, and wherein if the first effective time is smaller than a minimum execution time of the specific operation, the second effective time indicates the minimum execution time.

9. The client of claim 6, wherein the processor is configured to:

transmit, to the server, a second write request message to request the writing of the control point characteristic in order to indicate a cancellation of the specific operation;

receive a second write response message as a response to the second write request message; and receive, from the server, a second indication message indicating whether the specific operation has been aborted, wherein the second write request message comprises a second operation code indicating the cancellation of the specific operation.

10. The client of claim 6, wherein if the specific operation is an operation performed along with another device, the first write request message further comprises a device ID for identifying a peer device.

* * * * *